(12) United States Patent
Stamos

(10) Patent No.: US 11,494,347 B1
(45) Date of Patent: Nov. 8, 2022

(54) EFFICIENT UPDATE-ANYWHERE REPLICATION OF QUEUE OPERATIONS ON A REPLICATED MESSAGE QUEUE

(71) Applicant: Oracle International Corporation, Redwood Shores, CA (US)

(72) Inventor: James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/308,906

(22) Filed: May 5, 2021

(51) Int. Cl.
*G06F 16/182* (2019.01)
*G06F 16/27* (2019.01)

(52) U.S. Cl.
CPC .......... *G06F 16/1844* (2019.01); *G06F 16/27* (2019.01)

(58) Field of Classification Search
CPC .............................. G06F 16/1844; G06F 16/27
USPC ........................................................ 707/610
See application file for complete search history.

(56) References Cited

U.S. PATENT DOCUMENTS

| | | | |
|---|---|---|---|
| 9,589,041 B2 | 3/2017 | Tran et al. | |
| 9,747,356 B2 | 8/2017 | Lu et al. | |
| 9,830,372 B2 | 11/2017 | Rajamani et al. | |
| 10,191,932 B2 | 1/2019 | Lehouillier | |
| 2002/0095408 A1 | 7/2002 | Cheng | |

(Continued)

OTHER PUBLICATIONS

Wang et al., "Formal Specification and Verification of Smart Contracts in Azure Blockchain", dated Apr. 29, 2019, 13 pages.

(Continued)

*Primary Examiner* — Michael Pham
(74) *Attorney, Agent, or Firm* — Hickman Becker Bingham Ledesma LLP

(57) ABSTRACT

Update-anywhere replication of queuing operations on a replicated message queue is performed. A dequeue ready time ("ready time") is associated by each participating persistent storage server with a queue message to be dequeued. Unless a queue message is already locked by a distributed dequeue transaction, a participating leader PSS initiates a distributed dequeue transaction for the queue message once the ready time for the queue message is reached, subject to certain conditions. An initiator PSS is in effect designated for a queue message; the initiator PSS associates a desired ready time for the queue message. The designated PSS is referred to herein as the primary leader PSS and the ready time the primary PSS associates with queue message is referred as the primary ready time. The other participating leader PSSs are backup leader PSSs which serve as backups for dequeuing a queue message. Each backup leader PSS associates a later "backup ready time" with the queue message. In an embodiment, each backup ready time for a queue message is different. The primary ready time for a queue message together with backup ready times for the queue message form a more or less staggered set of ready times. If the primary leader PSS does not initiate dequeuing of a queue message before a successive backup ready time, the respective backup leader PSS may initiate dequeuing. This measure provides fault tolerance for dequeuing a queue message. Because the ready times are staggered, not all PSSs will initiate dequeuing at more or less the same time. Thus, initiator conflict is substantially reduced while fault tolerance is provided.

24 Claims, 7 Drawing Sheets

(56) References Cited

U.S. PATENT DOCUMENTS

| | | | |
|---|---|---|---|
| 2014/0379679 | A1 | 12/2014 | Kohno |
| 2017/0228371 | A1 | 8/2017 | Seger, II |
| 2018/0096163 | A1 | 4/2018 | Jacques et al. |
| 2018/0374086 | A1 | 12/2018 | Ardashev et al. |
| 2019/0179939 | A1 | 6/2019 | Govindarajan et al. |
| 2020/0050613 | A1 | 2/2020 | Gauvreau, Jr. |
| 2020/0142992 | A1 | 5/2020 | Ocher et al. |
| 2021/0073209 | A1 | 3/2021 | Loaiza et al. |
| 2022/0035652 | A1 | 2/2022 | Stamos et al. |
| 2022/0092083 | A1* | 3/2022 | Grimaldi ............... G06F 16/273 |

OTHER PUBLICATIONS

Samaniego et al., "Blockchain as a Service for IoT", 2016 IEEE International Conference on Internet of Things (iThings), 4 pages.

Rimba et al., "Comparing Blockchain and Cloud Services for Business Process Execution", dated n 2017, 4 pages.

Ezhilchelvan et al., "Non-Bocking Two Phase Commit Using Blockchain", 1st Workshop on Cryptocurrencies and Blockchains Distributed Systems, CryBlock'18, dated Jan. 1, 2018, pp. 36-41.

Ellis et al., "ChainLink A Decentralized Oracle Network", dated Sep. 4, 2017, 38 pages.

Anonymous: "Learning Key 20c New Features for Database Administrators", Details: Oracle Blockchain Table, dated Feb. 14, 2020, 4 pages.

Allen et al., "Veritas: Shared Verifiable Databases and Tables in the Cloud", CIDR'19, dated Jan. 2019, CA, 9 pages.

Wikipedia.com, "Two-Phase Commit Protocol", Wikipedia, The Free Encyclopedia, https://en.wikipedia.org/w/index.php?title=two-phase_commit_protocol&oldid=886121497, dated Mar. 2019, 9 pages.

Wikipedia.com, "Raft (Algorithm)", Wikipedia, The Free Encyclopedia, https://en.wikipedia.org/w/index.php?title=raft_(computer_science)&oldid=895121718, dated May 2019, 7 pages.

Loaiza, U.S. Appl. No. 16/923,279, filed Jul. 8, 2020, Non-Final Rejection dated Apr. 7, 2022.

* cited by examiner

Message Queue 103-1

| enqueue_time | message_delay | leader_seq# | leader_id | msg_state | msg_payload |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |

Queue Management Data 106-1
(in-memory)

| ready_time | other management data |
|---|---|
|  |  |
|  |  |
|  |  |
|  |  |
|  |  |
|  |  |
|  |  |

FIG. 1B

EFFICIENT UPDATE-ANYWHERE REPLICATION OF QUEUE OPERATIONS ON A REPLICATED MESSAGE QUEUE

FIELD OF THE INVENTION

The present invention relates to update-anywhere replication of replicated queue operations.

BACKGROUND

Traditional persistent storage systems can handle large volumes of data that are read and/or modified by multiple concurrent users. Enterprise-level persistent storage systems (hereafter PSSs) maintain data integrity, consistency, and security for the persistent data managed by the PSS.

A PSS may be a database management system ("DBMS") that manages a database, a file system that manages access to files, a key-value store system that stores key-value objects, document storage system (DOCS) manages access to documents (e.g. JSON documents). A PSS stores data in persistent data objects. A persistent data object may be, for example, a database table managed by a DBMS, key-value pairs managed by a key-value store system, documents managed by a DOCS, or a file managed by a file system. A persistent data object may be a composite data object, comprising multiple persistent data objects. For example, in a DBMS, a database table may comprise multiple rows as persistent data objects. In a file system, a file may comprise multiple blocks as data objects, and a directory may be a persistent object that contains files and even contains other directories as persistent data objects. In a DOCS, a persistent data object may be a collection of JSON documents. Various kinds of PSSs, such as DBMSs and key-value store systems, provide superior performance for updating and querying the persistent store.

Replication

An important function performed by PSSs is to participate in data replication within a distributed system of PSSs. In data replication, a set of replicated data objects is replicated among PSSs in a distributed system of PSSs. A copy of each data object in the set is maintained at each of the PSSs. Any changes made to the set of data objects are replicated at each of the PSSs.

There are many forms of data replication. In primary copy replication, all changes are made to a main copy of a replicated data object at a leader PSS. The leader sends the changes to the other PSSs to be replicated to their respective copy of the replicated data object.

A leader PSS may fail. When a leader PSS fails, one of the other PSSs in the distributed system eventually becomes the leader. Changes to a replicated object may not be made until a new leader is available.

A form of replication that can offer higher availability is update-anywhere replication. In update-anywhere replication, a change to a replicated data object may be initiated to any copy of the replicated data object in a distributed system of PSSs. The changes made to a copy of a replicated data object are replicated at other copies of the replicated data object at other PSSs in the distributed system. PSSs that participate in update-anywhere replication with respect to a set of data objects or operations are referred to herein as participating leader PSSs.

In general, the PSS on which the copy of a replicated data object is initiated is referred to as the initiator leader PSS, which coordinates the replication of the change. If one of the participating leader PSSs fails, the changes may still be made at any of the other leader PSSs without waiting to establish a new leader, as in the case of primary replication.

In update-anywhere replication, changes may be replicated synchronously. In synchronous replication, changes made to a copy of a replicated data object are immediately propagated and committed at the other copies as part of a distributed transaction. Because not all participating leader PSSs may be running, the commitment may be quorum-based, which does not require that all participating leader PSSs participate in committing a distributed transaction.

Update-anywhere replication does not deal well with hot spots in replicated data objects. Hot spots refer to portions of a replicated data object being changed at relatively the same time across multiple copies of the replicated data object.

Overhead from Hot Spots in Update-Anywhere Replicated Message Queues

An example of a replicated data object that may have hot spots is a replicated message queue in which PSSs of a distributed system are enqueuing and dequeuing queue messages. In general, queue messages are dequeued at the "head" of the queue using "exactly once processing". In an embodiment, exactly once processing means a message is dequeued within one "distributed dequeue transaction", which is executed by participating leader PSSs, and which may be initiated or otherwise coordinated by a single initiator PSS.

Dequeuing a queue message entails queue management operations, such as changing the queue message in copies of the message queue at each participating PSS to reflect that the queue message has been dequeued. Dequeuing a message also entails other operations, as described further below. Under update-anywhere replication, a form of contention referred to herein as initiator contention is possible. Initiator contention occurs when multiple PSSs acting as initiators independently and more or less simultaneously initiate distributed dequeue transactions to dequeue the same message.

Initiator contention can cause several forms of overhead. For example, a deadlock can occur between multiple distributed dequeue transactions attempting the same dequeue operation on the same queue message. Such deadlocks may be resolved using deadlock resolution mechanisms. However, deadlock resolution mechanisms entail additional overhead. Such overhead may include rolling back queue management operations, such as uncommitted changes made by a PSS to its message queue copy to dequeue the queue message.

In addition to rolling back queue management operations, other operations referred to herein as concomitant operations, which are performed as part of the distributed dequeue transaction, may need to be rolled back. In general, a concomitant operation is related to the purpose for which the message was enqueued. For example, a message may be to update a replicated data object, which is accomplished as part of a distributed dequeue transaction. An initiator PSS modifies the queue message in its copy of the message queue, updates a replicated data object, and then coordinates with the other PSSs (follower PSSs) to replicate queue management operations and the update to copies of the replicated data object. The coordination may involve sending a copy of a write set generated by the initiator PSS to reflect its updates to its copy of the replicated data object. A write set may include, for example, before and after change values that result from updating the replicated data object. The follower PSSs compare the write set from the initiator PSS against a write set the follower PSSs generated by their updates to their copy of the replicated data object. If the write sets match, the follower PSSs may approve committing the changes as part of the distributed dequeue transaction. The updates to the copies of the replicated data object is an example of concomitant operations.

As mentioned before, if multiple PSSs initiate dequeuing the queue message as initiator PSS under different distributed transactions, then a deadlock may occur. In this case, at least one of the PSSs will rollback changes it made, which may include changes to the replicated data object.

BRIEF DESCRIPTION OF THE, DRAWINGS

In the drawings:

FIG. 1B is a diagram depicting a copy of a replicated message queue and queue management data, according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

Described herein is an approach for update-anywhere replication of dequeuing operations (UARDQ). The approaches are based on a dequeue ready time ("ready time") that each participating leader PSS in a update-anywhere replication network associates for dequeuing a queue message from a replicated message queue. Unless a queue message has been dequeued or is locked for a distributed dequeue transaction, a participating leader PSS initiates a distributed dequeue transaction for the queue message once the participating leader PSS's ready time for the queue message is reached, subject to other conditions described later, A "lead" initiator PSS is in effect designated for a queue message; this designated PSS associates a desired ready time for the queue message. The designated PSS is referred to herein as the primary leader PSS with respect to the queue message and the ready time the primary PSS associates with the queue message is referred to as the primary ready time.

With respect to the queue message, the other participating leader PSSs are referred to herein as backup leader PSSs because, as explained in greater detail below, the backup leader PSSs serve as a backup for dequeuing the queue message. Each backup leader PSS associates a later "backup ready time" with the queue message.

In an embodiment, each backup ready time for a queue message differs from each other. The primary ready time for a queue message together with backup ready times for the queue message form a more or less staggered set of ready times. If the primary PSS does not initiate dequeuing of a queue message before the successive backup ready time, the respective backup leader PSS may initiate dequeuing. This measure provides fault tolerance for dequeuing a queue message. Because the ready times are staggered, not all PSSs will initiate dequeuing at more or less the same time. Thus, initiator conflict is substantially reduced while a strong measure of fault tolerance is provided.

Update-Anywhere Replication DBMS Network

UARDQ is described within the context of a network of participating leader PSSs that are database management systems ("DBMSs"), the participating leader DBMSs being referred to herein collectively as a Update-Anywhere Replication DBMS Network. FIG. 1 depicts a system of DBMSs that perform update-anywhere replication of dequeue operations on a replicated message queue.

Figure 1A:
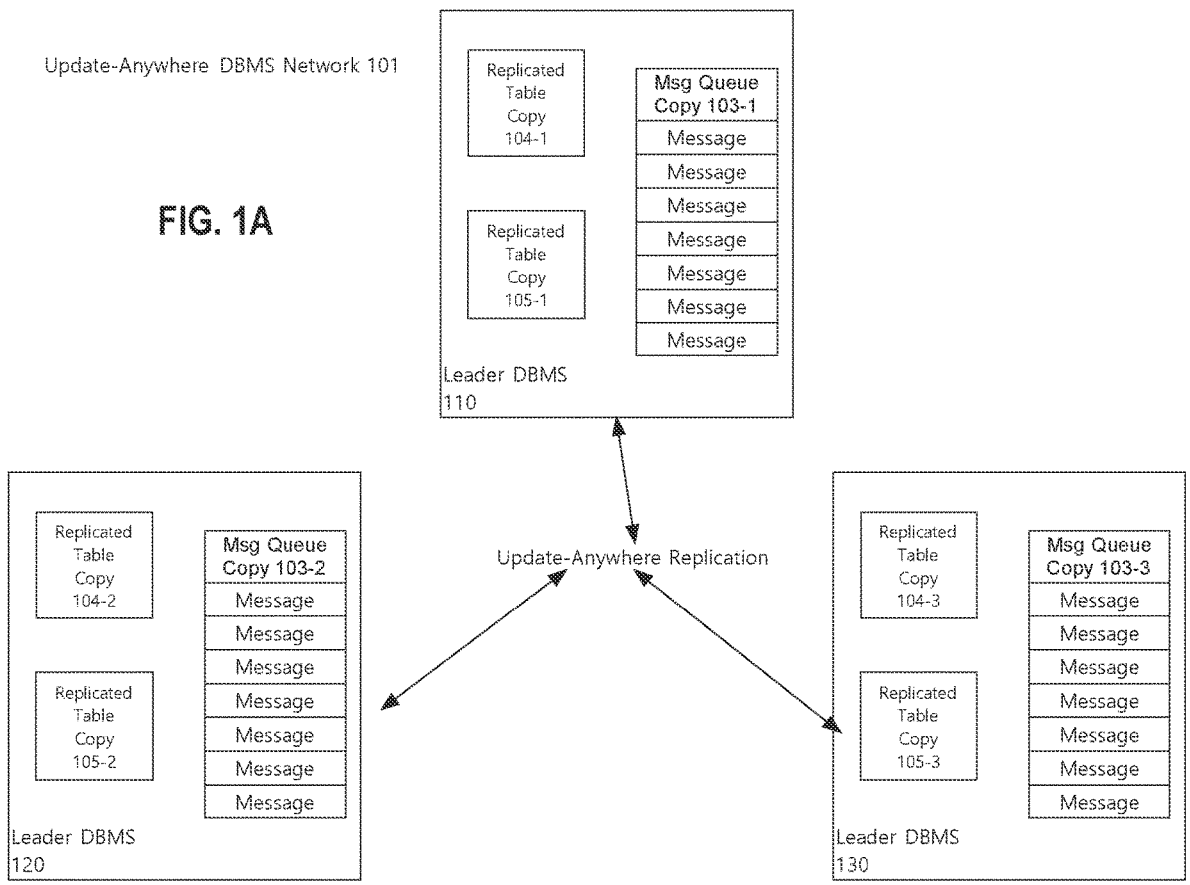
FIG. 1A is a diagram of a Update-Anywhere Replication DBMS Network according to an embodiment of the present invention.

Referring to FIG. 1A, it depicts Update-anywhere Replication DBMS Network 101. Update-anywhere Replication DBMS Network 101 comprises Leader DBMS 110, 120, and 130. Update-anywhere Replication DBMS Network 101 performs replication operations using a message queue comprising message queue copies 103-1, 103-2, and 103-3, which are maintained on Leader DBMS 110, 120, and 130, respectively. Message queue copies may be referred to herein collectively as a logical message queue 103. Accordingly, Leader DBMS 110, 120, and 130 are participating leader DBMSs with respect to message queue 103.

Leader DBMS 110, 120, and 130 are connected via a network, which is not depicted. Leader DBMS 110, 120, and 130 communicate messages over the network for many kinds of operations, including operations for update-anywhere replication and queue management.

Among replication operations performed using update-anywhere replication, Update-anywhere Replication DBMS Network 101 performs leader replication of two replicated tables. Similar to message queue 103, replicated table 104 includes replicated table copies 104-1, 104-2, and 104-3, which are stored and maintained on Leader DBMS 110, 120, and 130, respectively. Replicated table 105 comprises replicated table copies 105-1, 105-2, and 105-3, which are stored and maintained by Leader DBMS 110, 120, and 130, respectively.

FIG. 1B depicts a message queue copy 103-1 in greater structural detail, a structure shared by the message queue copies of message queue 103. Also depicted is Queue Management Data 106-1, which is used to manage message queue operations performed by Leader DBMS 110 with respect to message queue copy 103-1, such as enqueuing and dequeuing. Leader DBMSs 120 and 130 also have queue management data similarly or identically structured. According to an embodiment, message queue copy 103-1 is a table that includes columns. Each row contains column values for a queue message.

Enqueue_time—Enqueue time. Time a message is enqueued. The enqueue time may be used to calculate ready time.

Message_delay—Offset time to wait before dequeuing a message. The offset is an offset to the enqueue time and may be used to calculate a ready time.

Leader_seq—Leader sequence number. Each message enqueued by a particular leader DBMS is assigned a unique number reflecting the order in which the message is enqueued by the leader DBMS. In general, these numbers are assigned sequentially.

Leader_id—Leader DBMS id. An identifier that uniquely identifies a leader DBMS among the leader DBMSs of an Update-Anywhere Replication DBMS Network.

Msg_state—Message state. Information regarding the status of a queue message. For example, whether a queue message has been dequeued, when, and by which leader DBMS.

Msg_payload—Message payload. This data is the queue message content. Examples of content include changes to a replicated data object, and operations to replicate, such as scheduling a job. Note that an operation like scheduling a job involve changes to one or more data objects.

Columns enqueue time, message_delay, leader_seq#, leader_id, and msg_state are examples of queue message metadata Queue message metadata is data within a queue message that is used to manage queue operations of the queue message.

Queue management data 106-1 is data used to manage queue operations performed by Leader DBMS 110 on queue messages in message queue copy 103-1. In an embodiment, queue management data 106-1 is stored in memory and holds information about a moving window of working queue messages in message queue copy 103-1. Working queue messages include queue messages being dequeued or about to be dequeued in the near future or that have been dequeued in the recent past. Queue management data 106-1 also includes information about other message queue copies of other leader DBMSs of Update-Anywhere Replication DBMS Network 101, to support distributed transaction processing of queue operations.

Queue Management Data 106-1 tracks ready times for queue messages to dequeue that are in the active window. A ready time in queue management data 106-1 is specific to the queue message copy in message queue copy 103-1 and not to the respective queue message copies in message queue copies 103-2 and 103-3. As mentioned before, the ready time associated by each leader DBMS in Update-Anywhere Replication DBMS Network 101 for a copy of a queue message may differ.

Messages are enqueued using a distributed transaction initiated by one leader DBMS at the request of a client. Unlike a dequeue operation, in general multiple leader DBMSs in a Update-Anywhere Replication DBMS Network do not contend to initiate a distributed transaction to enqueue a particular queue message. Thus, there is little or no overhead attendant initiator contention like that described for dequeuing. Accordingly, the techniques described herein focus on dequeuing operations.

Overview of Dequeue Operations

A leader DBMS initiates dequeuing for a queue message at the ready time the leader DBMS tracks or otherwise associates with the queue message, unless the leader DBMS detects that another leader DBMS has initiated a distributed dequeue transaction for the queue message. As mentioned earlier, queue message copies of a queue message are respectively associated with staggered ready times across a Update-Anywhere Replication DBMS Network, with the primary leader DBMS for a queue message associating the earliest primary ready time with the queue message, and the backup leader DBMSs associating later backup ready times with the queue message.

When a distributed dequeue transaction for a queue message is committed, the queue management data of each of the participating leader DBMSs no longer tracks or otherwise associate a ready time with the dequeued queue message. Thus, queue management data only associates ready times with a queue message that has not been dequeued. These ready times are referred to herein as active ready times, and the associated queue messages are referred to herein as active queue messages. A primary leader DBMS or backup leader DBMS only attempts to initiate a distributed dequeue transaction for active queue messages.

When a leader DBMS initiates a dequeue operation, it initiates the dequeue operation as the initiator leader DBMS for the queue message. The other participating leader DBMSs become follower leader DBMSs with respect to the queue message. Within a local transaction on the initiator leader DBMS, the initiator leader DBMS first performs dequeue operations, which include changes to the respective copy of the message queue and any concomitant operations. These operations generate an "initiator write set".

Next, the initiator leader DBMS initiates the distributed queue transaction and sends a "dequeue message request" to the follower leader DBMSs to begin and participate in a distributed dequeue transaction to dequeue the message. The dequeue message request includes the initiator write set.

In response to receipt of the dequeue message request, the follower leader DBMSs initiate one or more local transactions to dequeue the queue message, which includes performing concomitant operations. These operations generate a "follower" write set. Also, these operations include locking the queue message for the distributed dequeue transaction.

It should be noted a follower leader DBMS may reach its backup ready time for the queue message while the copy of the queue message is active but before locally committing or otherwise completing the distributed dequeue transaction. However, locking the queue message copy for the distributed dequeue transaction prevents the follower leader DBMS from initiating its own distributed dequeue transaction for the queue message.

The follower leader DBMSs vote to commit the distributed dequeue transaction. The vote by each follower leader DBMSs may be based on a comparison of the respective follower write set to the initiator write set. If the write sets match, a follower leader DBMS votes to commit the distributed transaction. If the write sets do not match, the follower leader DBMS votes to not commit the distributed transaction.

The initiator leader DBMS receives the votes from the follower leader DBMSs and determines whether to commit the distributed dequeue transaction. The decision is made according to a consensus protocol. The consensus protocol may be quorum based, requiring a majority of the participating leader DBMSs to vote to commit the distributed dequeue transaction in order to commit the distributed dequeue transaction. Alternatively, the protocol may require unanimity of the leader DBMSs, as in the case of a normal two-phase commit. Examples of consensus protocols are described in "Native Persistent Store Support for Blockchains", filed on Jul. 17, 2020 by James W. Stamos, et al. as patent application Ser. No. 16/932,633, the entire contents of which are incorporated herein.

The initiator leader DBMS communicates the decision to the follower leader DBMSs. If the vote is to commit, the initiator leader DBMS commits the distributed dequeue transaction and the respective local transactions. Upon receipt of the decision from the initiator leader DBMS, the follower leader DBMSs record commitment of the distributed dequeue transaction and commit their respective local transactions. If the vote is not to commit, the initiator leader DBMS terminates the distributed dequeue transaction and rolls back the respective local transactions. Upon receipt of the decision from the leader DBMSs, the follower leader DBMSs record termination of the distributed dequeue transaction and roll back their respective local transactions.

Static Prioritization

An approach for staggered dequeue scheduling is referred to herein as static prioritization. Under static prioritization, the staggered ready times for a queue message are generated according to a "prioritization scheme" that is used by a Update-anywhere Replication DBMS Network to generate staggered ready times based on the content of a queue message. For example, a priority scheme may be based on a hash function that is applied to the content of the message to determine the primary leader DBMS and primary ready time, the backup leader DBMSs and respective backup delays, one for each of the backup leader DBMSs. The content of the message applied may include certain attributes of a queue message.

A backup delay is a period of time added to the primary ready time to determine the ready time of a backup leader DBMSs for a queue message. Under static prioritization, at least one backup delay generated for a queue message is earlier than any other backup delay generated for the queue message. The earliest backup delay may be disproportionately shorter than subsequent backup delay periods meaning the first backup delay is at least half any other backup delays calculated for the queue message. Dequeuing redundancy benefits most by intervention by the earliest backup leader DBMSs than by subsequent backups. If the subsequent backup delay were shorter, then more subsequent backup leader DBMSs would more often attempt to dequeue a queue message leading to potential greater initiator contention and overhead with relatively less benefit in fault tolerance and redundancy.

Figure 2:
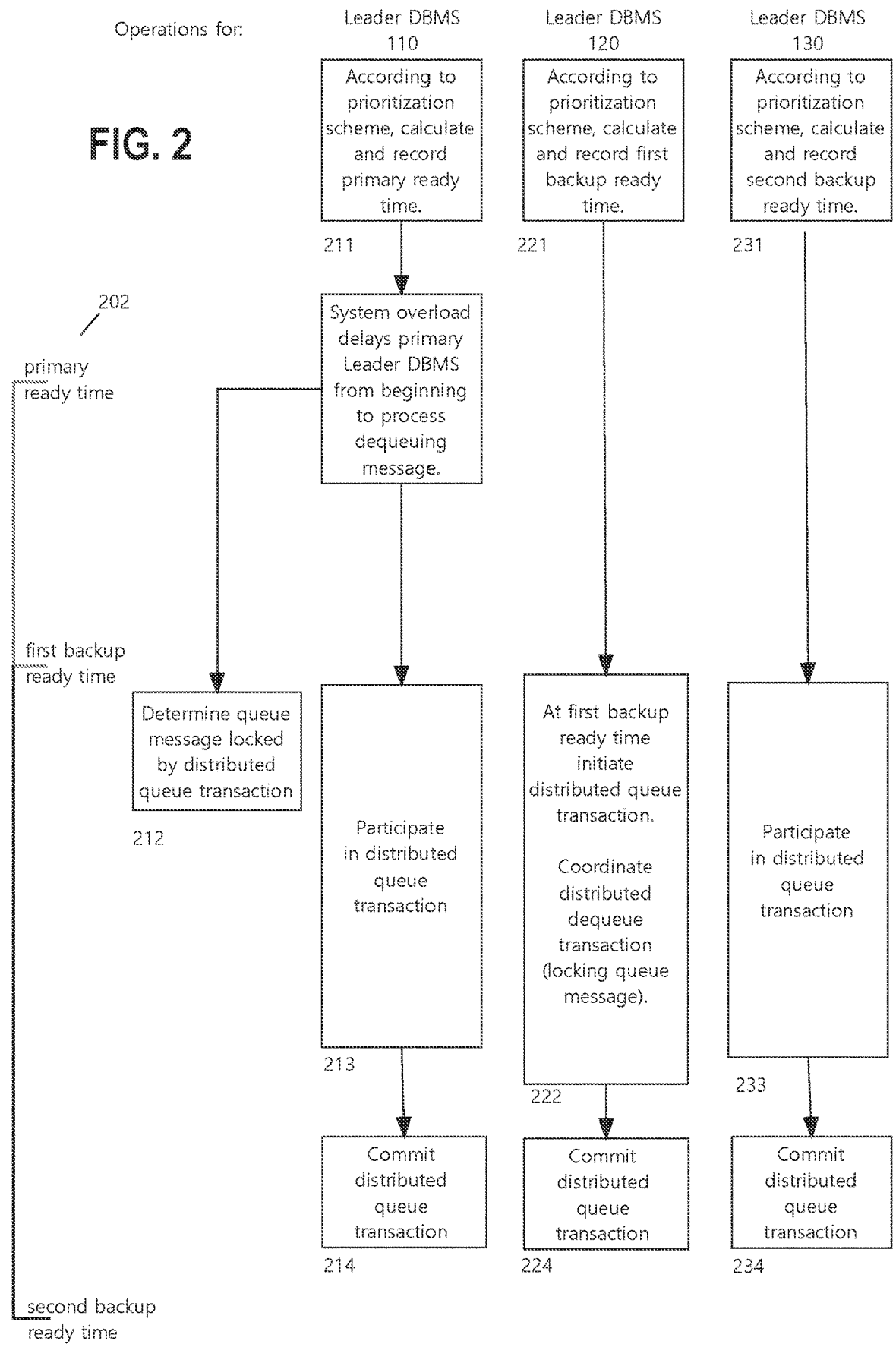
FIG. 2 is a diagram depicting static prioritization, a procedure for generating ready times for dequeuing a queue message, according to an embodiment of the present invention.

FIG. 2 depicts a dequeuing scenario used to illustrate static prioritization. In the scenario, the static prioritization scheme generates staggered ready times where Leader DBMS 110 is the primary leader DBMS, and Leader DBMS 120 & 130 are backup leader DBMSs. The scenario involves dequeuing a queue message that has been enqueued by any one of Leader DBMS 110, 120, & 130.

As part of maintaining an active window of queue messages in queue management data, Leader DBMS 110, 120, and 130 generate staggered ready times based on a prioritization scheme and the content of the queue message. (211, 221, 231) Accordingly, Leader DBMS 110 determines it is the primary leader DBMS for the queue message and determines a primary ready time for the queue message, which in the current illustration, is the enqueue time for the message. According to the priority scheme, Leader DBMS 120 generates the shorter backup delay, which after adding it to the enqueue time of the queue message, results in the first backup ready time for Leader DBMS 120, Leader DBMS 130 generates a greater backup delay resulting in a second backup ready time.

The primary ready time and the first and second backup ready times are shown in time scale 202. Operations shown in FIG. 2 are executed at times approximated by their position relative to time scale 202.

In an embodiment, the staggered times may be created when a queue message is enqueued and are stored as ready time queue message metadata within the queue message metadata of the queue message. The ready time metadata in the message may specify a primary ready time and a primary leader DBMS, and specify the first backup ready time and first backup leader DBMS, and so forth. As part of maintaining information for the active window of queue messages, the leader DBMSs examine ready time data in the queue message to populate the ready times in their respective version of queue management data.

Continuing with the current scenario, system overload in the Leader DBMS 110 delays its dequeuing of the queue message at the earlier primary ready time or even at the first backup ready time. At the first backup ready time, Leader DBMS 120 initiates dequeuing the queue message within a distributed dequeue transaction (222), having reached the first backup time and determined there is no lock by a distributed dequeue transaction on the queue message. Leader DBMS 120 interacts as initiator leader DBMS with follower Leader DBMS 110 and 130 to coordinate the distributed dequeue transaction.

Leader DBMS 110 and 130 participate in the distributed dequeue transaction. (213, 233) As explained earlier, this participation entails locking the queue message for the distributed dequeue transaction initiated by Leader DBMS 120. Leader DBMS 110 is prevented from initiating another distributed dequeue transaction for the queue message by Leader DBMS 110 determining that the queue message is already locked for the distributed dequeue transaction (212) and, in response, forgoing initiating another distributed dequeue transaction.

Leader DBMS 110, 120, and 130 participate to commit the distributed dequeue transaction to dequeue the queue message. The leader DBMSs modify their respective versions of the queue management data to remove the respective ready times or otherwise mark the ready times as having been acted upon. As a consequence, Leader DBMS 130 never even attempts to initiate dequeuing the queue message at the second backup ready time.

Random Backoff Delay

The static prioritization, in effect, relies on a "linear" schedule of backup ready times for each queue message to dequeue. One disadvantage of a linear schedule of backup ready times is that if several leader DBMSs are slow, groups of enqueued queue messages may not be dequeued for a while.

One approach that ameliorates potential high latency attendant linear backup schedules of static prioritization is the random backoff approach. Under the random backoff approach, backup leader DBMSs in effect await dequeuing for a backup delay plus a randomly-generated backoff delay ("random backoff") that falls within a random backoff range. In general, random backoff generated for a queue message ensure that multiple backup leader DBMSs are not initiating the dequeuing of a queue message at the same time.

The backup delay and random backoff range used for each leader DBMS may be varied and can be adjusted based on conditions at the leader DBMS or conditions of the Update-anywhere Replication DBMS Network. The random backoffs may be calculated for each backup leader DBMS at enqueue time and stored within queue message metadata.

Figure 3:
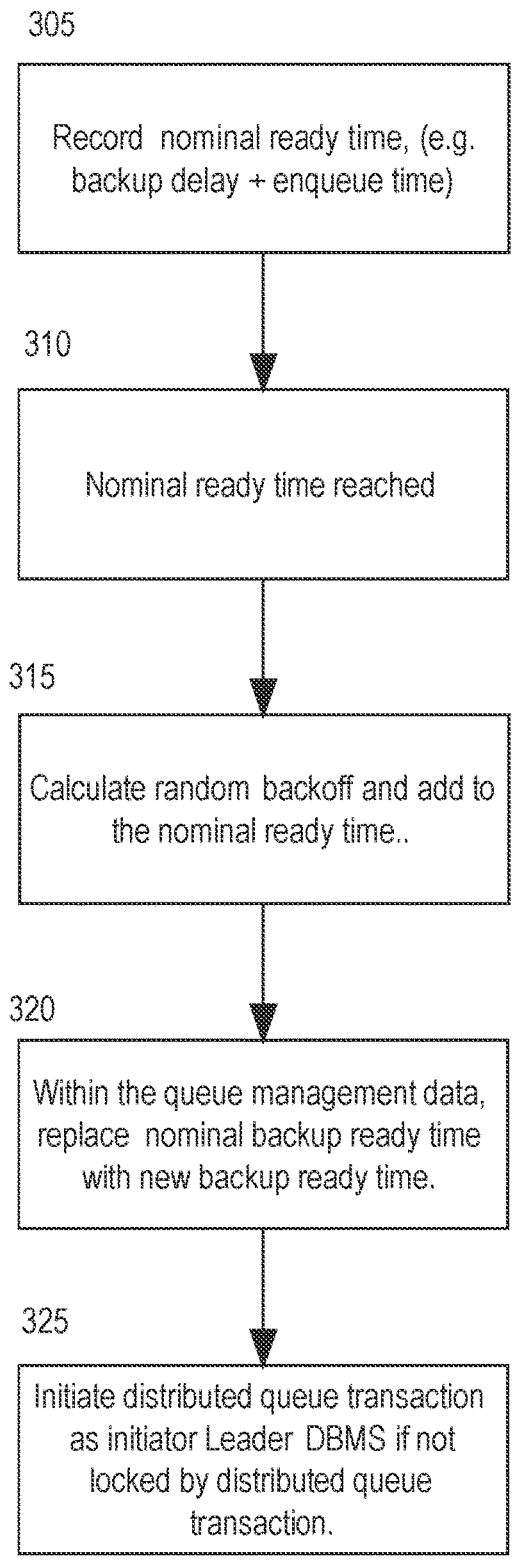
FIG. 3 is a diagram depicting random backoff delay, a procedure for generating ready times for dequeuing a queue message, according to an embodiment of the present invention.

In addition, the random backoff may be computed in piecemeal fashion to avoid computation of random backoffs. That is, the random backoff is not computed until, in effect, the expiration of the backup delay. FIG. 3 depicts a scenario where random backoffs are computed in piecemeal fashion by a backup leader DBMS for a queue message.

Referring to FIG. 3, a nominal backup ready time is calculated for the queue message and recorded within the queue management data of the backup leader DBMS. (305) According to an embodiment, the nominal backup ready time is computed by adding the backup delay to the enqueue time of the queue message.

The nominal backup ready time is reached while the queue message is active. (310) A random backoff is calculated and added to the nominal ready time to generate a new backup ready time. (315) Within the queue management data, the nominal backup ready time is removed and replaced by the new backup ready time. (320) If the queue message is active at the time of the new backup ready time, the backup leader DBMS checks whether a distributed queue transaction holds a lock on the queue message. If not, the backup leader DBMS initiates a distributed dequeue transaction as initiator leader DBMS. (325)

Enqueuer Ordering

In an embodiment, queue messages enqueued by a leader PSS are dequeued in the order the leader PSS enqueued the queue message. The order is referred to herein as the enqueuing order; dequeuing in enqueuing order is referred to herein as ordered dequeuing.

In embodiments that use ordered dequeuing, the enqueue times of the queue messages enqueued by a particular enqueuer reflect the order in which the queue messages are enqueued. However, in update-anywhere replication, it is possible that a later enqueued message with a later enqueue time is committed before an earlier enqueued message that has an earlier enqueue time. In this situation, a ready time for the later enqueued message may be recorded in the queue management data while the ready time for the earlier enqueue time is not. Thus, at any particular instant of time, the order of ready times recorded by queue message data may not reflect the actual enqueuing order.

A measure that ensures ordered dequeuing uses enqueuer sequence numbers to enforce dequeuing order. A leader DBMS will not initiate dequeuing of a queue message at its ready time until the queue message enqueued by the same leader DBMS that has the preceding enqueuer sequence number has been dequeued.

Delaying dequeuing in the above way is referred to herein as ready time ordering delay. While ready time ordering delay ensures ordered dequeuing, it does cause additional overhead. Under Static Prioritization and Random Backup Delay, backup ready times may be generated in a different order than enqueuing order. Through approaches referred to herein as ready time ordering adjustment, the backup ready times are reordered to be consistent with enqueuing ordering.

Figure 4:
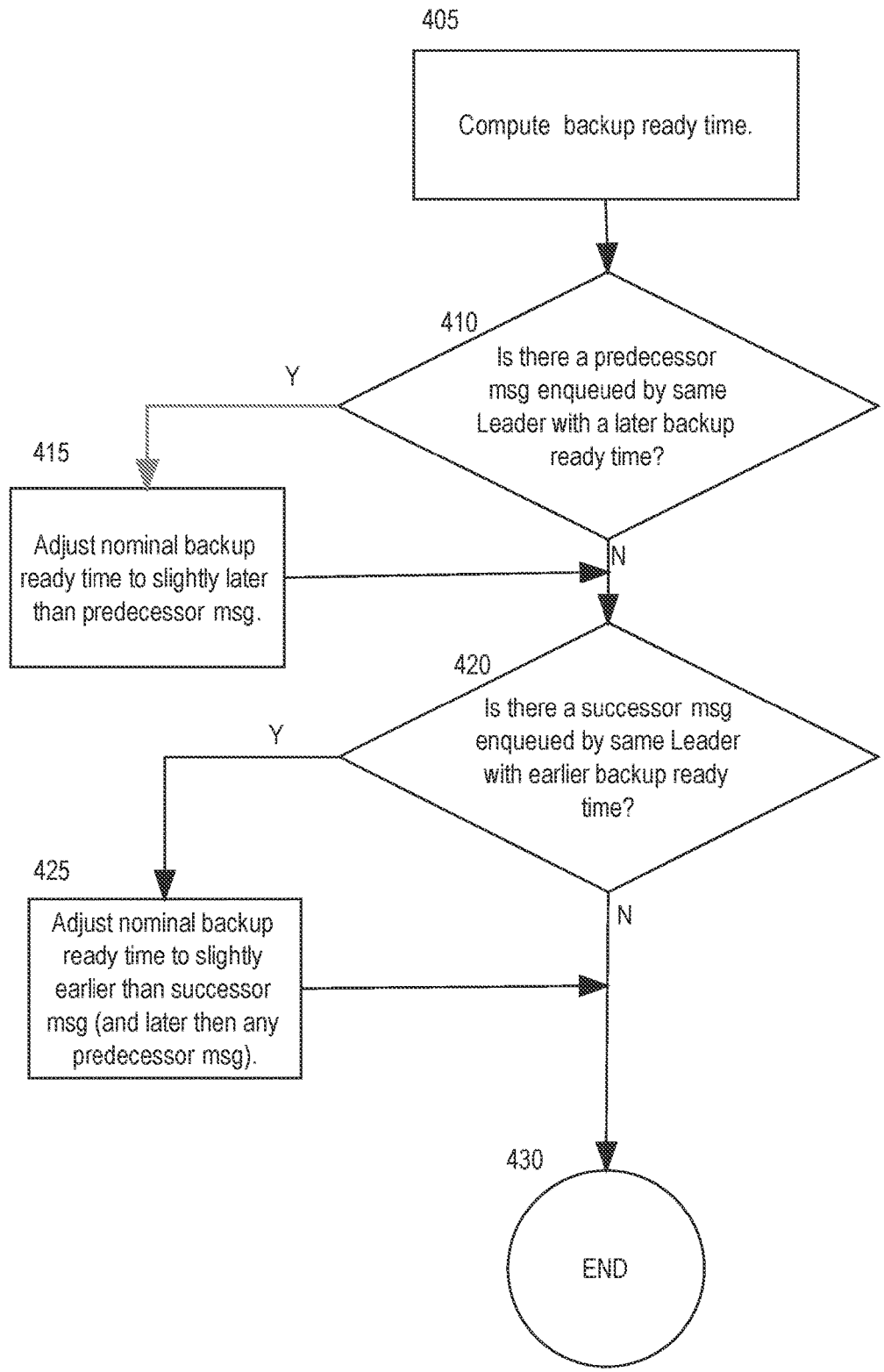
FIG. 4 depicts a procedure for re-ordering queue messages, according to an embodiment of the present invention.

FIG. 4 depicts a procedure for ready time ordering adjustment according to an embodiment of the present invention. The steps are performed by a leader DBMS with respect to its copy of the message queue and a copy of a queue message. After describing the procedure, it is then illustrated with three scenarios.

A nominal backup ready time is computed for the queue message, for example, as described above for Static Prioritization and Random Backup Delay. (405) Next, it is determined whether there is an active predecessor queue message, a predecessor message being the queue message that is enqueued by the same leader DBMS and that has the previous leader sequence number relative to that of the queue message. If so, then it is determined whether the backup ready time of the predecessor queue message is later than that of the nominal backup ready time. (410) If so, then the nominal backup ready time is adjusted to be slightly later than the backup ready time of the predecessor queue message. (415)

Next, it is determined whether there is an active successor queue message enqueued by the same leader DBMS, a successor message being the queue message with the subsequent leader sequence number relative to that of the queue message. If so, then it is determined whether the backup ready time of the successor queue message is earlier than that of the current nominal backup ready time. (420) If so, then the nominal backup ready time is adjusted to be slightly earlier than the backup ready time of the successor queue message but later than that of any predecessor queue message. (425) The nominal backup ready time, with any of the aforementioned adjustments, becomes the ready time to record for the queue message in the queue management data.

Ready Adjustment Examples

The ready time ordering adjustment can be illustrated by using three related examples. Each example enqueues a new queue message, but the nominal ready time for the new queue message at a backup leader DBMS is different in each example. In the examples, the predecessor message to the new queue message has a ready time of 10:00:00 AM at the backup leader DBMS, and a successor queue message has a ready time ten seconds later at 10:00:10 AM at the backup leader DBMS. Also, assume the predecessor message, the new queue message, and the successor queue message are enqueued on a message queue by the same enqueuing leader DBMS.

Example 1: The nominal ready time for the new queue message is 9:59:30 AM, which is before 10:00:00 AM, the ready time of the predecessor queue message. (410) The nominal time is adjusted to 10:00:00.000001 AM, which is slightly later than the ready time of the predecessor message. (415)

Example 2: The nominal ready time for the new queue message is 10:00:03 AM. This time is between the 10:00:00 AM and 10:00:10 AM (410 and 420), the ready times of the predecessor and successor queue messages, respectively. This nominal ready time is the ready time to record for the queue message in the queue management data.

Example 3: The nominal ready time for the new queue message is 10:00:17 AM, which is after 10:00:10 AM, the ready time of the successor queue message. The nominal ready time is adjusted to 10:00:09.999999 AM, which is slightly earlier than the ready time of the successor queue message. (425)

Variations and Alternatives Approaches

To control the tradeoff between minimizing latency and minimizing duplicative processing, the static priority approach and the random backoff may be adjusted in a variety of ways.

Each approach can have a relatively small subset of participants as primary leader PSSs for each queue message by giving each primary leader PSS the same or approximately the same ready time.

Each approach can make a small subset of backup leader PSSs faster responders by having shorter initial wait times and/or smaller random backoffs. The number in the subset is usually much smaller than the number of participants.

Each approach can make a number of backup leader PSSs slower responders by having larger initial wait times and/or larger random backoff ranges.

One Designated Database Only

To avoid initiator contention, only a single designated PSS associated with a queue message will initiate dequeuing the queue message. One example of a designated PSS is the PSS that enqueued the queue message. Another example is a PSS specified in a particular attribute of a message. If the designated PSS is slow or down, the PSS may not process the message in a timely fashion or at all. From the perspective of PSS clients, service availability can suffer. Failover strategies may be employed, but such strategies are typically heavyweight and coarse-grained (e.g., at the level of a DBMS or queue). Failover strategies must also balance failover latency with the probability of premature failover.

All Participants at Once Independently

All participating PSSs dequeue each message independently and then try to combine all local transactions (or a quorum of local transactions) into a single distributed dequeue transaction by comparing write sets made by each of the local transactions. If the write sets are identical, the distributed dequeue transaction, including the local transactions, may be committed. If the write sets are different, the write set at one PSS is chosen in some fashion (e.g., by a deterministic decision algorithm or by electing a winner). The approach can tie up resources such as transactions and sessions for long periods of time because the approach needs to wait for all participants (or a quorum of participants) to decide to dequeue the queue message. This approach will not work well for dequeuing that is non-deterministic, that is, which depends on the state of a PSS (e.g. state of database) at the time the dequeue operation. This approach may not work well for queue messages that must be dequeued by PSS clients explicitly via, for example, by a queue message identifier rather than dequeuing queue messages in default order (e.g., enqueuing order).

Transaction Processing Overview

In transaction processing, changes to persistent data objects are made by transactions. A transaction is a set of operations that change persistent data objects. All the changes for a transaction are made atomically. The changes are made permanent by committing the transaction. If the transaction cannot be committed, or is aborted or otherwise not committed, the transaction is rolled back.

In a distributed transaction processing, multiple PSS participants commit a distributed transaction to change respective data objects using a phased approach that is managed by a transaction manager. The phased approach includes at least a phase in which the participants reach a prepared state. When in a prepared state for a transaction, the participant has performed the operations needed to reach a state where the participant can guarantee to be able to commit the transaction but has not yet committed the transaction. A participant may be instructed to reach the prepared state by the transaction manager and communicate to the transaction manager whether the participant has reached the prepared state.

Transaction processing, as the term is used herein, also requires journaling. In journaling, changes made by a transaction to a persistent data object are stored in a persistent journal. A persistent journal comprises journal records that record changes made by a transaction to a data object. Each record may specify what field, column, elements, or portion of a data object were changed and the new values thereof created by the change. The old values that were replaced by the new value may also be specified.

In write-ahead journaling, journal records for changes made by a transaction are stored persistently before committing a transaction and/or to reach a prepared state. In addition, the journal can be read by other PSSs to replicate persistent data objects.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object lasses, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to database statement requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command does not refer to statement that merely queries database data.

In a distributed transaction, multiple DBMSs commit a distributed transaction using two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMS.

A two-phase commit involves two phases, the prepare-to-commit phase and the commit phase. In the prepare-to-commit phase, branch transaction is prepared in each of the participating database systems. When a branch transaction is prepared on a DBMS, the database is in "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server j and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
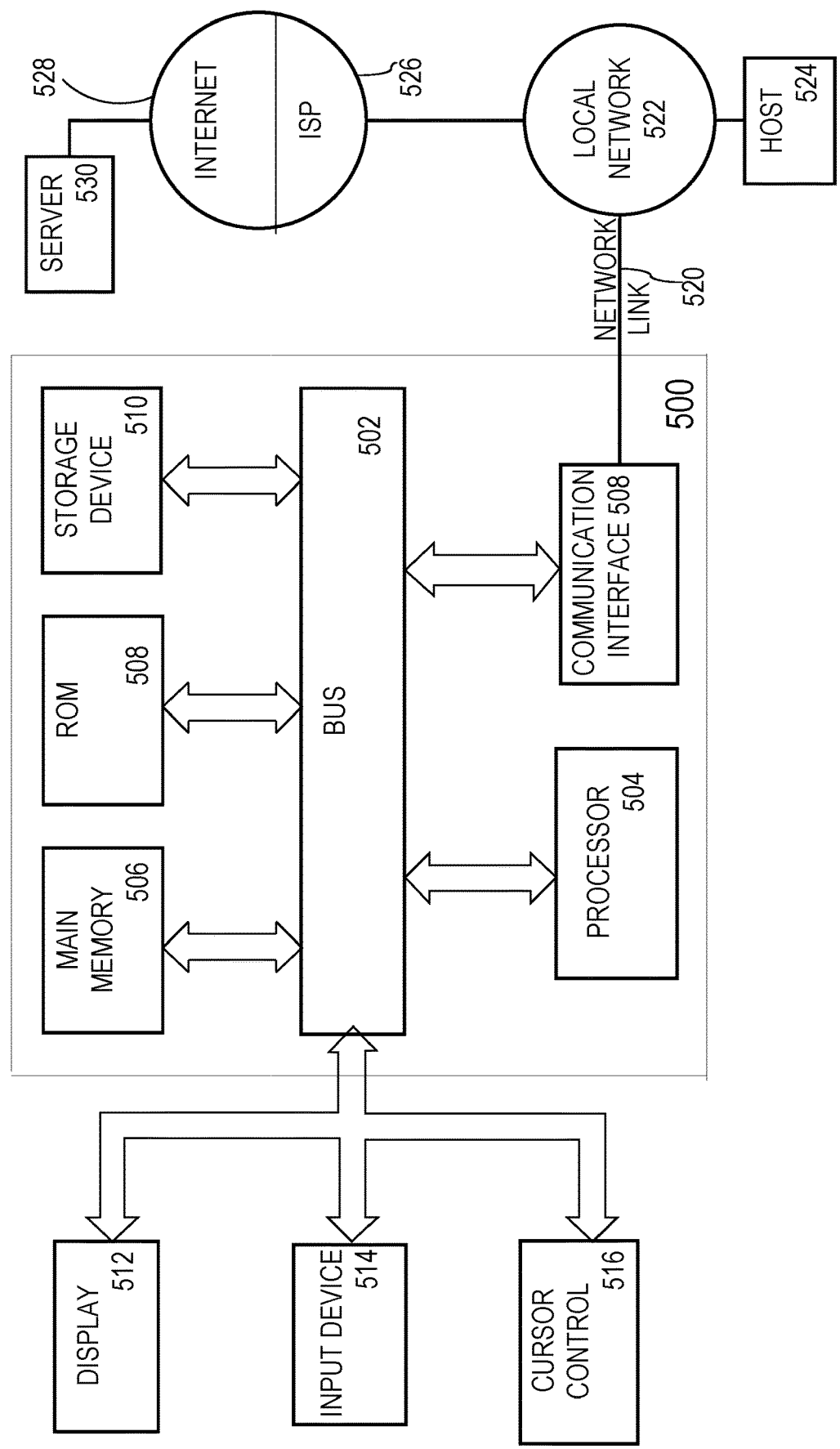
FIG. 5 is a diagram depicting a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information, Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504, Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
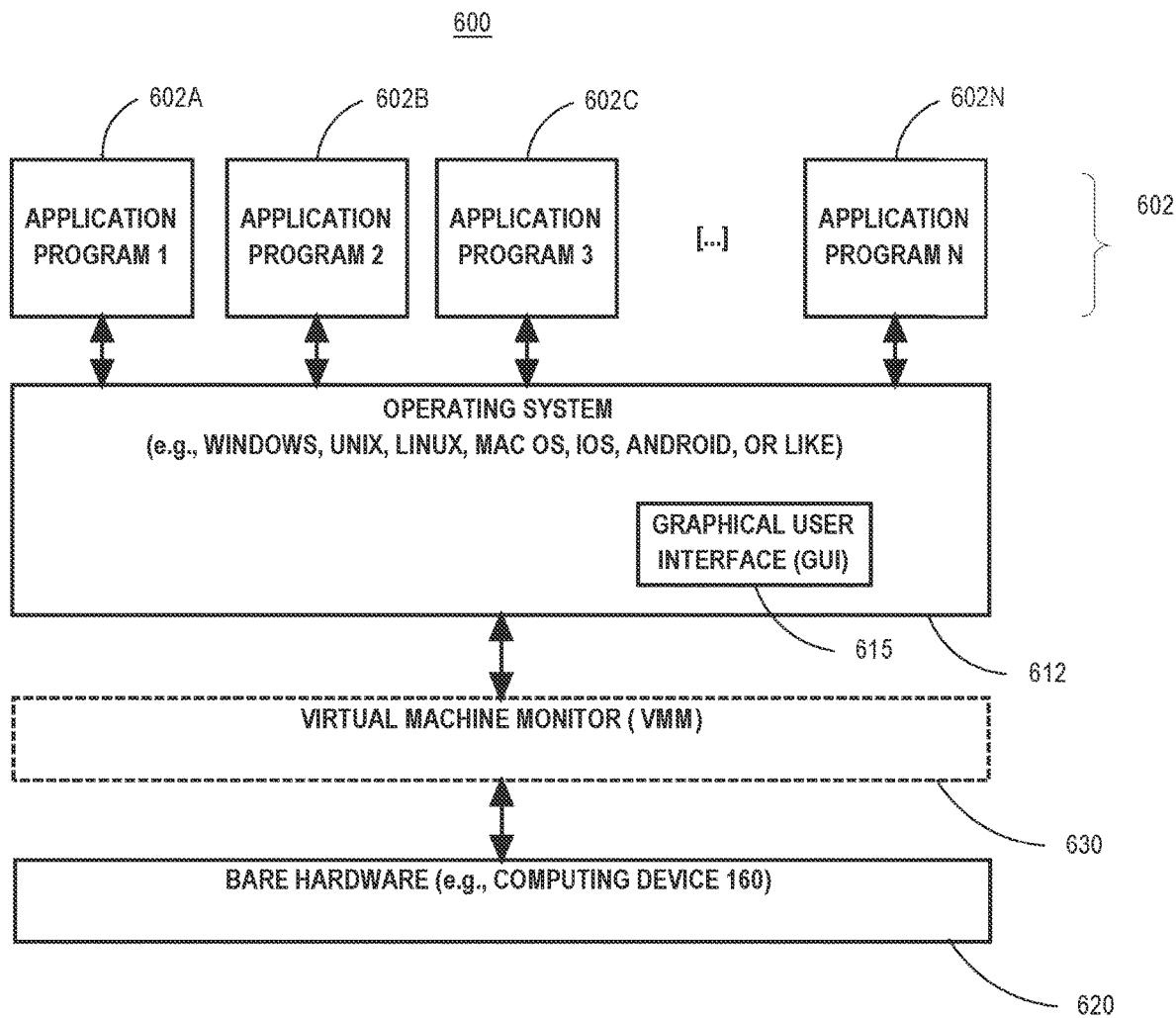
FIG. 6 depicts a software system that may be employed for controlling the operation

FIG. 6 is a block diagram of a basic software system 600 that may be employed for controlling the operation of computer system 1100. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 1100. Software system 600, which may be stored in system memory (RAM) 1106 and on fixed storage (e.g., hard disk or flash memory) 1110, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 1110 into memory 1106) for execution by the system 600. The applications or other software intended for use on computer system 1100 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results operation from the OS 610 and application(s) 602, whereupon the user may supply additional inputs or terminate the session (e.g., log off).

OS 610 can execute directly on the bare hardware 620 (e.g., processor(s) 1104) of computer system 1100. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 1100.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 1100 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   each leader PSS of a plurality of leader PSSs coordinating a respective set of distributed dequeue transactions of a plurality of distributed dequeue transactions, each distributed dequeue transaction of said plurality of distributed dequeue transactions executing a respective dequeue operation of a plurality of dequeue operations on a respective queue message of a replicated message queue, said respective dequeue operation involving one or more concomitant operations based on a payload of said respective queue message;

for each dequeue operation of said plurality of dequeue operations, calculating respective staggered ready times for performing said each dequeue operation, said staggered ready times including:

a primary ready time for a respective primary leader PSS of said plurality of leader PSSs to perform said each dequeue operation;

a respective plurality of backup ready times for a respective plurality of backup leader PSSs of said plurality of PSSs, wherein each respective backup ready time of said respective plurality of backup ready times being for a respective backup leader PSS of said respective plurality of backup leader PSSs to perform said each dequeue operation;

wherein calculating respective staggered ready times for each dequeue operation of said plurality of dequeue operations includes calculating first staggered ready times for a first dequeue operation of said plurality of dequeue operations to dequeue a first queue message of said replicated message queue within a first distributed dequeue transaction, said first staggered ready times including a first primary ready time and first backup ready times that include a first backup ready time for a first backup leader PSS of said plurality of PSSs, said first backup ready time being later than said first primary ready time;

said first backup leader PSS initiating a first distributed dequeue transaction of said plurality of distributed dequeue transactions at the first backup ready time; and said first backup leader PSS coordinating commitment of said first distributed dequeue transaction.

2. The method of claim 1, wherein calculating said first staggered ready times includes:

calculating a plurality of backup delays including a first backup delay; and calculating said first backup ready time by at least adding said first backup delay to said first primary ready time.

3. The method of claim 2, wherein said plurality of backup delays includes a second backup delay at least twice as great as the first backup delay.

4. The method of claim 2, wherein:

calculating said first staggered ready times includes calculating a plurality of random backoffs that include a first random backoff; and calculating said first backup ready time by at least adding said first backup delay includes adding said first random backoff.

5. The method of claim 4, wherein the calculating said first backup ready time includes:

calculating a nominal backup ready time for dequeuing said first queue message;

said first backup leader PSS recording within queue management data said nominal backup ready time in association with said first queue message; and after said recording within said queue management data said nominal backup ready time:

performing said calculating said first backup ready time; and recording said first backup ready time in place of said nominal backup ready time.

6. The method of claim 1, wherein calculating said first backup ready time includes:

calculating a nominal ready time for said first backup ready time; and in response to determining said nominal ready time is not greater than a second backup ready time recorded for a predecessor queue message of said replicated message queue, adjusting said nominal ready time such that said nominal ready time is greater than said second backup ready time.

7. The method of claim 1, wherein calculating said first backup ready time includes:

calculating a nominal ready time for said first backup ready time; and in response to determining said nominal ready time is not less than a second backup ready time recorded for a successor queue message of said replicated message queue, adjusting said nominal ready time such that said nominal ready time is less than said second backup ready time.

8. The method of claim 1, wherein said first backup leader PSS coordinating commitment of said first distributed dequeue transaction includes:

receiving a plurality of votes on whether to commit said first distributed dequeue transaction that are sent by another leader PSS of said plurality of leader PSSs; and wherein at least one vote of said plurality of votes specifies not to commit said first distributed dequeue transaction.

9. The method of claim 8, wherein:

the method further includes said first backup leader PSS executing said first distributed dequeue transaction within one or more local transactions that generate a first write set; and wherein said first backup leader PSS coordinating commitment includes said first backup leader PSS sending a dequeue message request and said first write set to said another leader PSS.

10. The method of claim 1, wherein one or more concomitant operations include to replicate a change to a replicated data object that is different than said replicated queue message.

11. The method of claim 1, wherein each leader PSS of said plurality of leader PSSs is a database management system.

12. The method of claim 1, wherein each leader PSS of said plurality of leader PSSs is a document storage system.

13. One or more non-transitory computer-readable media storing; one or more sequences of instructions that, when executed by one or more processors, cause:

each leader PSS of a plurality of leader PSSs coordinating a respective set of distributed dequeue transactions of a plurality of distributed dequeue transactions, each distributed dequeue transaction of said plurality of distributed dequeue transactions executing a respective dequeue operation of a plurality of dequeue operations on a respective queue message of a replicated message queue, said respective dequeue operation involving one or more concomitant operations based on a payload of said respective queue message;

for each dequeue operation of said plurality of dequeue operations, calculating respective staggered ready times for performing said each dequeue operation, said staggered ready times including:

a primary ready time for a respective primary leader PSS of said plurality of leader PSSs to perform said each dequeue operation;

a respective plurality of backup ready times for a respective plurality of backup leader PSSs of said plurality of PSSs, wherein each respective backup ready time of said respective plurality of backup ready times being for a respective backup leader PSS of said respective plurality of backup leader PSSs to perform said each dequeue operation;

wherein calculating respective staggered ready times for each dequeue operation of said plurality of dequeue operations includes calculating first staggered ready times for a first dequeue operation of said plurality of dequeue operations to dequeue a first queue message of said replicated message queue within a first distributed dequeue transaction, said first staggered ready times including a first primary ready time and first backup ready times that include a first backup ready time for a first backup leader PSS of said plurality of PSSs, said first backup ready time being later than said first primary ready time;

said first backup leader PSS initiating a first distributed dequeue transaction of said plurality of distributed dequeue transactions at the first backup ready time; and said first backup leader PSS coordinating commitment of said first distributed dequeue transaction.

14. The one or more non-transitory computer-readable media of claim 13, wherein calculating said first staggered ready times includes:

calculating a plurality of backup delays including a first backup delay; and calculating said first backup ready time by at least adding said first backup delay to said first primary ready time.

15. The one or more non-transitory computer-readable media of claim 14, wherein said plurality of backup delays includes a second backup delay at least twice as great as the first backup delay.

16. The one or more non-transitory computer-readable media of claim 14, wherein:

calculating said first staggered ready times includes calculating a plurality of random backoffs that include a first random backoff; and calculating said first backup ready time by at least adding said first backup delay includes adding said first random backoff.

17. The one or more non-transitory computer-readable media of claim 16, wherein the calculating said first backup ready time includes:

calculating a nominal backup ready time for dequeuing said first queue message;

said first backup leader PSS recording within queue management data said nominal backup ready time in association with said first queue message; and after said recording within said queue management data said nominal backup ready time:

performing said calculating said first backup ready time; and recording said first backup ready time in place of said nominal backup ready time.

18. The one or more non-transitory computer-readable media of claim 13, wherein calculating said first backup ready time includes:

calculating a nominal ready time for said first backup ready time; and in response to determining said nominal ready time is not greater than a second backup ready time recorded for a predecessor queue message of said replicated message queue, adjusting said nominal ready time such that said nominal ready time is greater than said second backup ready time.

19. The one or more non-transitory computer-readable media of claim 13, wherein calculating said first backup ready time includes:

calculating a nominal ready time for said first backup ready time; and in response to determining said nominal ready time is not less than a second backup ready time recorded for a successor queue message of said replicated message queue, adjusting said nominal ready time such that said nominal ready time is less than said second backup ready time.

20. The one or more non-transitory computer-readable media of claim 13, wherein said first backup leader PSS coordinating commitment of said first distributed dequeue transaction includes:

receiving a plurality of votes on whether to commit said first distributed dequeue transaction that are sent by another leader PSS of said plurality of leader PSSs; and wherein at least one vote of said plurality of votes specifies not to commit said first distributed dequeue transaction.

21. The one or more non-transitory computer-readable media of claim 20, wherein:

the one or more sequences of instructions include instructions, that when executed by said one or more processors, causes said first backup leader PSS executing said first distributed dequeue transaction within one or more local transactions that generate a first write set; and wherein said first backup leader PSS coordinating commitment includes said first backup leader PSS sending a dequeue message request and said first write set to said another leader PSS.

22. The one or more non-transitory computer-readable media of claim 13, wherein one or more concomitant operations include to replicate a change to a replicated data object that is different than said replicated queue message.

23. The one or more non-transitory computer-readable media of claim 13, wherein each leader PSS of said plurality of leader PSSs is a database management system.

24. The one or more non-transitory computer-readable media of claim 13, wherein each leader PSS of said plurality of leader PSSs is a document storage system.

* * * * *

UNITED STATES PATENT AND TRADEMARK OFFICE
CERTIFICATE OF CORRECTION

PATENT NO. : 11,494,347 B1
APPLICATION NO. : 17/308906
DATED : November 8, 2022
INVENTOR(S) : James W. Stamos Page 1 of 2

It is certified that error appears in the above-identified patent and that said Letters Patent is hereby corrected as shown below:

On the Title Page

On page 2, Column 2, Item (56) under Other Publications, Line 1, delete ""Non-Bocking" and insert -- "Non-Blocking --, therefor.

In the Drawings

On sheet 7 of 7, in FIG. 6, under Reference Numeral 630, Line 1, delete "( VMM)" and insert -- (VMM) --, therefor.

In the Specification

In Column 3, Line 12, delete "THE," and insert -- THE --, therefor.

In Column 3, Line 36, delete "operation" and insert -- operation. --, therefor.

In Column 3, Line 57, delete "later," and insert -- later. --, therefor.

In Column 5, Line 16, delete "enqueue time," and insert -- enqueue_time, --, therefor.

In Column 7, Line 53, delete "120," and insert -- 120. --, therefor.

In Column 8, Line 47, delete "backoff" and insert -- backoffs --, therefor.

In Column 12, Line 4, delete "lasses," and insert -- classes, --, therefor.

In Column 13, Line 34, delete "server j" and insert -- server) --, therefor.

In Column 14, Line 58, delete "information," and insert -- information. --, therefor.

Signed and Sealed this
Sixth Day of June, 2023

Katherine Kelly Vidal
*Director of the United States Patent and Trademark Office*

CERTIFICATE OF CORRECTION (continued)
U.S. Pat. No. 11,494,347 B1

In Column 14, Line 67, delete "504," and insert -- 504. --, therefor.

In Column 15, Line 21, after "axis" insert -- (e.g., --, therefor.

In Column 17, Line 17, after "results" insert -- of --, therefor.

In Column 18, Line 41, after "infrastructure" insert -- (i.e., --, therefor.

In the Claims

In Column 20, Line 45, in Claim 13, delete "storing;" and insert -- storing --, therefor.